Patented Dec. 30, 1941

2,268,131

UNITED STATES PATENT OFFICE 2,268,131

PROCESS OF TREATING CLAYS

George J. Barker and Emil Truog, Madison, Wis., assignors to Wisconsin Alumni Research Foundation, Madison, Wis., a corporation of Wisconsin No Drawing. Application April 6, 1938, Serial No. 200,425

7 Claims. (Cl. 106—72)

This invention relates to a pH control process of treating clay and clay mixtures used in the manufacture of brick, building tile, drain tile, sewer pipe, and other clay ware formed out of clay and clay mixtures, but not including white wares or those made by the slip process, and to the products obtained from clay after such treatment, and has for its object the production of clay ware with superior qualities in the way of greater strength, greater durability, better appearance, and decreased water absorption capacity.

Another object of the process is a lessening in the power required to force the moistened and pugged clay mass through the forming dies, in case forming is done, and in some cases a lowering of the temperature required in firing to properly burn the ware.

Still another object lies in making it possible to use clays for the purposes mentioned which without this treatment are not suitable.

In the manufacture of the clay ware mentioned various difficulties arising from the quality of the particular raw clay used are encountered. Many clay deposits, conveniently and favorably located with respect to factories and markets, cannot now be used for the manufacture of brick, tile, and other clay products that must meet certain standard specifications, for the reason that they lack certain properties in the raw clay essential to a satisfactory product. For instance, certain characteristics of many raw clays render the finished product so porous that it absorbs an excessive amount of water and is thus subject to rapid deterioration upon weathering. Further, the finished product may also have a laminated structure which greatly lessens its strength and durabiltiy.

These difficulties are caused partly by a lack of those desirable properties in the raw clay which allow a proper separation of the compound clay particles during the tempering, working, and pugging of the moist clay mass. For best results these compound clay particles or granules should break down, allowing the individual particles to move and come close together so that they may exert their full binding forces and form a dense, uniform body that resists lamination on being forced through the dies, and hence gives a product of high quality.

We have discovered that these desirable properties may be imparted to clays used in the manufacture of the products mentioned, and the workability of the clays greatly improved by an exacting control of the pH of the clay and clay mixtures involved. In the case of the acid clays, this control or adjustment falls within the very limited pH range of 6 to 8.5, and in the case of the non-acid clays, it falls within the pH range of 7.3 to 9.5. An acid clay is understood to mean one that gives a pH below 7 by any of the well known tests; likewise a non-acid clay is one that gives a pH of 7 or higher. If the pH resulting from the treatment falls short or goes beyond the ranges given, the full desirable results are not obtained.

The narrowness of the desirable and effective pH range of 6 to 8.5 which is the range that acid clays should be adjusted to, is only fully appreciated when one realizes that the pH scale or method of expressing reaction is logarithmical, and that pH 7 is the neutral point. Thus the pH range of 4 to 5, in which range many acid clays fall, involves 100 times as much acid or alkali as is involved in the pH range of 6 to 7, or 50 times as much as is involved in the range of 6 to 8, and 10 times as much as is involved in the range of 8 to 9. This means that, although a considerable amount of neutralizing material may have to be added to bring the pH of an acid clay up to pH 6, a relatively very small additional amount will push the pH beyond 8.5 and thus partly or completely nullify the desirable results of the treatment. In other words, to be effective, a proper and close control of the pH involved is essential, for if slightly too little or too much basic material is added, the full desirable results are not attained. Without this close control of the pH and a knowledge of the factors involved, the addition of various materials for the improvement of clays in the manner indicated and for the purposes mentioned becomes a matter which is so largely accidental that it is of little or no practical use.

A very important matter that must be considered in this connection is the buffer capacity of a clay. By buffer capacity of a clay is meant the resistance which a clay exhibits in allowing a change of pH through the addition of a base or acid. Some clays, the well-buffered ones, require the addition of much more base than others to effect a given change in pH. Thus, it does not hold at all, that because two clays have the same pH (reaction) to start with, that they will require the same amount of base to bring them both within the desired pH range. Depending upon buffer capacity and original pH, one clay may require 10 to 50 times as much base as another, in order that the desired results may be obtained. The amount of base required in each case, depending upon buffer capacity, can be determined by means of appropriate tests or measurements hereinafter described.

Processes have previously been proposed for the improvement of clays through the addition of various materials, but because it was not known that the pH of the clay is the important factor that must be controlled within narrow limits, and that the buffer capacity of the clay is an important consideration, the difficulties encountered by manufacturers in the respects mentioned have remained unsolved, and as a result, attempts have been made to overcome these difficulties by the use of other processes such as the de-airing process, which, while effective under certain conditions, requires expensive machinery and introduces other difficulties. Our process is much more effective in many cases than the de-airing process and in addition is less expensive.

We have been unable to find any reference, anywhere, relative to this process of controlling within a narrow specified range the pH of clays used in the manufacture of the products previously detailed, in order to impart to the clay the desirable qualities mentioned, and we believe that, prior to our invention, it was not known that by controlling the pH of a clay within a narrow specified range the properties so essential to highly satisfactory manufactured products of the kinds referred to can be imparted to the clay.

In carrying out our pH control process of treating clays, we proceed as follows: In order to find out first how much basic material needs to be added to any particular clay to bring it within the effective pH range (a pH of 6 to 8.5 in the case of acid clays and a pH of 7.3 to 9.5 in the case of the non-acid clays), a preliminary test is made. This determination, as will be apparent to any chemist skilled in this particular field, may be done in several different ways. A convenient procedure for determining the pH of the natural or raw clay to be treated is to place a carefully selected 10 gram sample of the clay in powdered form in a beaker or other suitable vessel, and to it add 25 cc. of distilled water. After thorough mixing by vigorous stirring, a measurement of the pH of this clay-water suspension is made by means of the glass electrode or other suitable method.

Having determined whether the clay is acid or non-acid, the next step is to determine how much base it takes to bring the clay if it is acid within the pH range of 6 to 8.5, and if it is neutral or alkaline within the pH range of 7.3 to 9.5. To do this we proceed as follows: Place another carefully selected 10 gram sample of the powdered clay from the same batch in question, in a beaker or other suitable vessel, and to it add 25 cc. of distilled water containing one gram of potassium chloride. The mixture of clay and water are then thoroughly stirred, after which successive small amounts of standard base (0.10 or 0.05 normal $Na_2CO_3$ or $K_2CO_3$) are added from a burette. After each addition of alkali, the mixture is thoroughly stirred for 10 to 15 minutes, after which the pH of the mixture or suspension is determined by means of a standard procedure such as that involving the use of the glass electrode. The addition of a soluble neutral salt like potassium chloride prior to the addition of the alkali facilitates the reaction between the base and the clay and thus makes the pH reading more reliable. In this manner, which is in fact a titration, it is determined how much base needs to be added to any particular clay in order to bring the pH of the clay within the desired pH range. This result is then used in making stoichiometric calculations as to the amount of basic material which should be used in practice.

It should be explained that, in general, the more acid the clay is to start with (the lower the pH), the less beyond pH 6 is it necessary to bring the clay through the addition of basic materials; and the less acid it is to start with (the higher the pH), the closer is it necessary to bring the pH to 8.5 in order to obtain the desired results. Similarly, in the case of the neutral and non-acid clays, the lower the pH is to start with (the less the alkalinity), the less beyond pH 7.3 is it necessary to bring the clay through the addition of basic materials; and the higher the pH to start with the closer is it necessary to bring the pH to 9.5 in order to obtain the desired results. Having determined by titration or other procedure how much base it takes to bring a particular clay within the desired pH range, this amount is then used in a factory trial run. Depending upon the particular mode of operation and method of adding the base, the exact amount of base that will give the highest efficiency may need to be lessened or increased slightly. This can be easily and quickly done by anyone skilled in the art involved, by observing the plasticity and physical condition of the formed clay masses being produced.

The total amount of base needed in practice may be supplied in several ways. In certain cases it may be desirable to supply a portion of the basic material in the form of barium or calcium or magnesium oxides, hydroxides, or carbonates. These when used should be added and mixed with the clay prior to the addition of the alkali compounds (hydroxides, and carbonates of the alkali metals and ammonia). In case a clay contains a considerable amount of soluble sulfates, acid sulfates or free sulfuric acid, causing the production of soluble alkali salts when the alkali base or bases are later added, which soluble salts have a flocculating influence on the clay and thus prevent the favorable influence of the alkali, barium oxide, hydroxide, or carbonate should be added in an amount which is sufficient to combine with the major portion of this sulfate, causing it to be precipitated in insoluble form. The amount needed is arrived at by first making a determination of the amount of water soluble sulfates present in the clay, and then calculating stoichiometrically the amount of barium oxide, hydroxide, or carbonate needed to combine with these sulfates or free sulfuric acid. The balance of the base needed, calculated on the basis of the titration or other determination previously made and the amount of barium compound just added, is then usually supplied as the hydroxides or carbonates of the alkali metals or as ammonia. A portion of this balance may be supplied as the oxide, hydroxide, or carbonate of magnesium or the alkaline earth metals.

Because of their cheapness and efficacy, sodium hydroxide and sodium carbonate are at present recommended. They (the compounds of sodium or other alkalies) may be added either in solution or in powder form usually just prior to tempering and pugging of the clay, but may be added at any time prior to and during the forming of the product in the dies or other forming devices. The total amount of base needed with different clays usually ranges from 0.05 per cent to as much as 2 per cent and more. In the case of the non-acid clays, unless they contain considerable amounts of soluble sulfate, when some barium compound may need to be added in accordance with the directions previously given, a small amount of alkali alone usually suffices. In the case of the common strongly acid clays, a portion of the base needed may, for economy, be supplied as common lime, that is calcium oxide or hydroxide, after which the pH of the clay is finally brought within the range of pH 6 to 8.5 through the addition of an alkali.

CLASSIFICATION OF CLAYS AND SUMMARY OF TREATMENT IN ACCORDANCE WITH THE pH CONTROL PROCESS

I. *Acid clays (pH less than 7).*
  (A) Those clays that do not contain considerable amounts of soluble sulfates or free sulfuric acid. Proceed directly according to (1) or (2) as follows:
    (1) Add in accordance with tests sufficient hydroxide or carbonate of the alkali metals or ammonia to the clay to give a pH of 6.0 to 8.5.
    (2) Add to the clays in accordance with tests some oxide, hydroxide, or carbonate of the alkaline earth metals or magnesium to neutralize a portion of the acidity and then add sufficient hydroxide or carbonate of the alkali metals or ammonia to give a pH of 6.0 to 8.5.
  (B) Those clays that contain considerable amounts of soluble sulfates or free sulfuric acid. Add to the clays in accordance with tests, barium oxide, hydroxide, or carbonate to precipitate soluble sulfates, and then proceed according to (1) or (2) as follows:
    (1) Add to the clays in accordance with tests sufficient hydroxide or carbonate of the alkali metals or ammonia to give a pH of 6.0 to 8.5.
    (2) Add to the clays in accordance with tests some oxide, hydroxide, or carbonate of the alkaline earth metals or magnesium to neutralize a portion of the acidity and then add sufficient hydroxide or carbonate of the alkali metals or ammonia to give a pH of 6.0 to 8.5.

II. *Non-acid clays (pH of 7 or greater).*
  (A) Those clays that do not contain considerable amounts of soluble sulfates. Proceed directly as follows:
    (1) Add to the clays in accordance with tests sufficient hydroxide or carbonate of the alkali metals or ammonia to give a pH of 7.3 to 9.5.
  (B) Those clays that contain considerable amount of soluble sulfates. Add to the clays in accordance with tests, barium oxide, hydroxide, or carbonate to precipitate soluble sulfates, and then proceed according to (1) as follows:
    (1) Add to the clays in accordance with tests sufficient hydroxide or carbonate of the alkali metals or ammonia to give a pH of 7.3 to 9.5.

Our improved process has been applied to a large number of clays under carefully controlled conditions, and we have obtained the following benefits over what is obtained in using the ordinary processes now in general use: (1) the power consumption required for forcing the clay through the dies has been reduced 10 to 50 per cent; (2) the water absorbing capacity of the finished product has been reduced 10 to 30 per cent; (3) lamination in the product has been lessened; (4) the strength of the product has been increased; (5) the appearance of the product has been improved; and (6) the temperature of firing has usually been reduced. The extent of the benefits obtained will, of course, vary with the character of the clay treated and the particular type of plant operation. Much greater and also lesser benefits may be obtained in certain cases.

It is to be understood that we do not wish to be limited by the exact wording of the foregoing discussion, much of which is merely by way of illustration and not limitation, since many deviations in the manner of carrying out the process will be apparent to those skilled in the art, without departing from the spirit of the invention or the scope of the claims.

We claim:
1. In the manufacture of brick and like clay products formed by the stiff mud process from a clay mass sufficiently stiff so that it does not run under the influence of gravity, that improvement which comprises incorporating in said clay mass a basic material from the group consisting of the hydroxides and carbonates of the alkali metals and ammonia in an amount such that at least 10% of the base exchange capacity of the clay mass is saturated with basic constituents from the group consisting of the alkali metals and ammonia and further limiting the quantity of said basic material incorporated in said clay mass to an amount which gives said clay mass a pH within the range pH 6 to pH 8.5 for acid clays and within the range pH 7.3 to pH 9.5 for non-acid clays.

2. In the manufacture of brick and like clay products formed by the stiff mud process from a clay mass sufficiently stiff so that it does not run under the influence of gravity, that improvement which comprises incorporating in said clay mass a basic material from the group consisting of the oxides, hydroxides and carbonates of the alkaline earth metals and magnesium and a basic material from the group consisting of the hydroxides and carbonates of the alkali metals and ammonia, said last mentioned basic material being in an amount such that at least 10% of the base exchange capacity of the clay mass is saturated with basic constituents from the group consisting of the alkali metals and ammonia and further limiting the total quantity of said basic materials incorporated in said clay mass to an amount which gives said clay mass a pH within the range pH 6 to pH 8.5 for acid clays and within the range pH 7.3 to pH 9.5 for non-acid clays.

3. In the manufacture of brick and like clay products formed by the stiff mud process from a clay mass sufficiently stiff so that it does not run under the influence of gravity, that improvement which comprises incorporating in said clay mass a basic material from the group consisting of the oxide, hydroxide or carbonate of barium in amount sufficient to precipitate the soluble sulfates, acid sulfates and free sulfuric acid in said clay which would otherwise give rise to soluble alkali salts and cause flocculation and also incorporating in said clay mass a basic material from the group consisting of the hydroxides and carbonates of the alkali metals and ammonia, said last mentioned basic material being in an amount such that at least 10% of the base exchange capacity of the clay mass is saturated with basic constituents from the group consisting of the alkali metals and ammonia and further limiting the total quantity of said basic materials incorporated in said clay mass to an amount which gives said clay mass a pH within the range pH 6 to pH 8.5 for acid clays and within the range pH 7.3 to pH 9.5 for non-acid clays.

4. In manufacturing from acid clays brick and like clay products by the stiff mud process from a clay mass sufficiently stiff so that it does not run under the influence of gravity, that improvement which comprises incorporating in said clay mass a basic material from the group consisting of barium oxide, hydroxide or carbonate to precipitate the soluble sulfates, acid sulfates and free sulfuric acid present which would otherwise give rise to soluble alkali salts and cause flocculation, then incorporating in said clay mass both a material from the group consisting of the oxides, hydroxides and carbonates of the alkaline earth metals and magnesium to neutralize a portion of the acidity of said clay and a basic material from the group consisting of the hydroxides and carbonates of the alkali metals and ammonia, said last mentioned basic material being in an amount such that at least 10% of the base exchange capacity of the clay mass is saturated with basic constituents from the group consisting of the alkali metals and ammonia and further limiting the total quantity of said basic materials incorporated in said clay mass to an amount which gives said clay mass a pH within the range pH 6 to pH 8.5.

5. In manufacturing from acid clays brick and like clay products by the stiff mud process from a clay mass sufficiently stiff so that it does not run under the influence of gravity, that improvement which comprises incorporating in said clay mass a basic material from the group consisting of barium oxide, hydroxide or carbonate to precipitate the soluble sulfates, acid sulfates and free sulfuric acid present which would otherwise give rise to soluble alkali salts and cause flocculation, then incorporating in said clay mass a basic material from the group consisting of the hydroxides and carbonates of the alkali metals and ammonia, said last mentioned basic material being in an amount such that at least 10% of the base exchange capacity of the clay mass is saturated with basic constituents from the group consisting of the alkali metals and ammonia and further limiting the total quantity of said basic materials incorporated in said clay mass to an amount which gives said clay mass a pH within the range pH 6 to pH 8.5.

6. As a composition of matter, a clay product for use in the manufacture of clay ware formed out of clay masses sufficiently stiff so that they do not run under the influence of gravity, comprising a dense plastic mass of clay sufficiently stiff so as not to run under the influence of gravity, and a basic material from the group consisting of the hydroxides and carbonates of the alkali metals and ammonia in an amount such that at least 10% of the base exchange capacity of the clay mass is saturated with basic constituents from the group consisting of the alkali metals and ammonia and in amount such that the clay mass has a pH within the range pH 6 to pH 8.5 for an initially acid clay and within the range pH 7.3 to pH 9.5 for an initially non-acid clay.

7. As a composition of matter, a clay product for use in the manufacture of clay ware formed out of clay masses sufficiently stiff so that they do not run under the influence of gravity, comprising a dense plastic mass of clay sufficiently stiff so as not to run under the influence of gravity, and a basic material from the group consisting of the oxides, hydroxides and carbonates of the alkaline earth metals and magnesium and a basic material from the group consisting of the hydroxides and carbonates of the alkali metals and ammonia, said last mentioned basic material being in an amount such that at least 10% of the base exchange capacity of the clay mass is saturated with basic constituents from the group consisting of the alkali metals and ammonia, the total quantity of said basic materials incorporated in said clay mass being such that said clay mass has a pH within the range pH 6 to pH 8.5 for initially acid clays and within the range pH 7.3 to pH 9.5 for initially non-acid clays.

GEORGE J. BARKER.
EMIL TRUOG.